(12) United States Patent
Hensinger

(10) Patent No.: US 11,517,839 B2
(45) Date of Patent: Dec. 6, 2022

(54) FILTER ARRANGEMENT

(71) Applicant: Mahle International GmbH, Stuttgart (DE)

(72) Inventor: Heiko Hensinger, Stuttgart (DE)

(73) Assignee: Mahle International GmbH

( * ) Notice: Subject to any disclaimer, the term of this patent is extended or adjusted under 35 U.S.C. 154(b) by 464 days.

(21) Appl. No.: 16/669,502

(22) Filed: Oct. 30, 2019

(65) Prior Publication Data
US 2020/0129903 A1    Apr. 30, 2020

(30) Foreign Application Priority Data
Oct. 31, 2018 (DE) .................... 10 2018 218 632.4

(51) Int. Cl.
*B01D 46/00*     (2022.01)
*B60K 15/03*     (2006.01)

(52) U.S. Cl.
CPC ..... *B01D 46/0005* (2013.01); *B01D 46/0004* (2013.01); *B60K 15/03* (2013.01); *B01D 2201/295* (2013.01); *B60K 2015/03236* (2013.01)

(58) Field of Classification Search
CPC ............ B01D 46/0005; B01D 46/0004; B01D 2201/295; B01D 29/21; B01D 2201/0415; B01D 2201/291; B01D 2201/4007; B01D 2201/4053; B01D 35/16; B01D 35/153; B01D 35/02; B60K 15/03; B60K 2015/03236; F02M 37/34; F02M 37/42
See application file for complete search history.

(56) References Cited

U.S. PATENT DOCUMENTS

| | | | |
|---|---|---|---|
| 9,023,203 B2 | 5/2015 | Ardes | |
| 9,205,355 B2 | 12/2015 | Deschamps et al. | |
| 9,555,351 B2 | 1/2017 | Grass et al. | |
| 9,731,235 B2 | 8/2017 | Grass et al. | |

(Continued)

FOREIGN PATENT DOCUMENTS

| DE | 10 2007 062 102 A1 | 6/2009 |
|---|---|---|
| DE | 10 2009 054 523 A1 | 6/2011 |

(Continued)

OTHER PUBLICATIONS

English abstract for DE-10 2013 202 446.
English abstract for DE-10 2016 124 587.

*Primary Examiner* — Waqaas Ali
(74) *Attorney, Agent, or Firm* — Fishman Stewart PLLC

(57) ABSTRACT

A filter arrangement may include a filter housing and a ring filter element arranged in the filter housing. The ring filter element may include an upper end plate, a lower end plate, and a filter material arranged therebetween. An axially projecting pin may be disposed on the lower end plate and may engage into a channel on a filter housing side. The filter arrangement may also include a tubular dome which may engage into an interior of the ring filter element. The tubular dome may have a guide contour. The guide contour may cooperate with a guide element arranged on the ring filter element and may have an axial groove. The guide contour may be configured as at least one of a circular ramp and a chamfered cannula. On the upper end plate, an axial stop may project into the interior of the ring filter element.

19 Claims, 2 Drawing Sheets

(56) References Cited

U.S. PATENT DOCUMENTS

2012/0267293 A1\* 10/2012 Ardes ................ B01D 35/147
                                                     210/418
2015/0367265 A1\* 12/2015 Grass .................... B01D 35/30
                                                     210/232

FOREIGN PATENT DOCUMENTS

| DE | 10 2013 202 446 A1 | 8/2014 | |
|----|---|---|---|
| DE | 10 2013 202 449 A1 | 8/2014 | |
| DE | 10 2016 124 587 A1 | 6/2018 | |
| EP | 2 490 786 A1 | 8/2012 | |
| WO | 2014/153542 A1 | 9/2014 | |
| WO | WO-2017050367 A1 \* | 3/2017 | ............. B01D 29/21 |

\* cited by examiner

FILTER ARRANGEMENT

CROSS-REFERENCE TO RELATED APPLICATIONS

This application claims priority to German Patent Application No. DE 10 2018 218 632.4, filed on Oct. 31, 2018, the contents of which are hereby incorporated by reference in its entirety.

TECHNICAL FIELD

The present invention relates to a filter arrangement, in particular an oil- or fuel filter, with a filter housing, in which a ring filter element is arranged. The invention relates furthermore to a ring filter element for such a filter arrangement.

BACKGROUND

From EP 2 490 786 B1 a generic filter arrangement with a filter housing is known, in which a ring filter element is arranged. The ring filter element has here a pin projecting axially from a lower end plate, which pin, when the filter arrangement is mounted, engages into a channel on the filter housing side, in particular into an idling channel, and closes the latter. In addition, a tubular dome is provided which, when the filter arrangement is mounted, engages into an interior of the ring filter element. In order to be able to position the pin on the filter element side with respect to the channel on the filter housing side, in addition a guide contour is provided at a free end of the tubular dome, which cooperates with a guide element arranged on the ring filter element.

A disadvantage in the filter arrangement known from the prior art, however, is that an axial stop of the ring filter element in the filter housing takes place via the lower end plate on a component which is fixed to the filter housing, which, however, generally makes difficult the determining of tolerances between a filter housing cover, a filter housing bowl and the ring filter element arranged therein, because the filter material, for example a bellows, situated between the upper and the lower end plate, is included with its tolerances into the determining.

SUMMARY

The present invention is therefore concerned with the problem of indicating, for a filter arrangement of the generic type, an improved or at least an alternative embodiment, which in particular overcomes the disadvantage known from the prior art.

This problem is solved according to the invention by the subject of the independent claim(s). Advantageous embodiments are the subject of the dependent claim(s).

The present invention is based on the general idea, in a generic filter arrangement, of no longer bringing about an axial stop of a ring filter element in a filter housing via the lower end plate, but rather via an axial stop arranged on the upper end plate and thereby of simplifying a tolerance design of a filter housing cover or respectively of a tolerance between filter housing and ring filter element, because the pleat star, i.e. the filter material, no longer has to be taken into consideration for the tolerance design. The filter arrangement according to the invention, which can be configured for example as an oil- or fuel filter, has a filter housing in which a ring filter element is arranged. The filter housing usually consists of a filter housing bowl and a filter housing cover which is able to be screwed therewith. The ring filter element itself has an upper endplate, a lower end plate and a filter material arranged therebetween, for example a pleat star folded in a zigzag shape, wherein on the lower end plate an axially projecting pin is arranged which, when the filter device is mounted, engages into a channel on the filter housing side, for example an idling channel, and thereby closes the latter and enables the operation of the filter arrangement. Furthermore, a tubular dome is provided which, when the filter arrangement is mounted, engages into an interior of the ring filter element and which, for example, can be arranged on a function carrier, i.e. a separate component, or on the filter housing, in particular on the filter housing bowl. At a free end of this tubular dome a (circular)-ramplike or cannula-like guide contour is provided, which cooperates with a guide element arranged on the ring filter element and which has an axial groove, towards which the guide element is guided on mounting of the filter arrangement, wherein the guide element is arranged relative to the pin in such a way that the latter is then able to be introduced exclusively into the channel on the filter housing side, in so far as the guide element enters into the axial groove. As stated, the guide contour is formed here in the manner of a circular ramp or in the manner of a chamfered cannula. According to the invention, an axial stop, projecting into the interior of the ring filter element, is now arranged on the upper end plate, via which axial stop the axial stop of the ring filter element takes place relative to the dome and therefore to the filter housing. In order to prevent damage being brought about through a punctiform and therefore unfavourable contact surface between the axial stop and the ramp or respectively the cannula, the axial stop is, furthermore, formed in a complementary manner to the guide contour at the free end of the tubular dome and, with the ring filter element mounted in the filter arrangement, lies flat against this guide contour. The axial stop is therefore also formed in the manner of a circular ramp or in the manner of a chamfered cannula, in each case, however, at least partially as a negative contour of the guide contour, and thereby brings about the flat abutting against the latter, and in addition prevents a twisting of the ring filter element, whereby the risk of pleat block formation can be reduced. Of course, the axial stop can also have a different shape, this must merely bring about a flat abutting against the guide contour and a protection against twisting. The axial stop therefore constitutes a negative contour of the guide contour. With the filter arrangement according to the invention it is therefore possible to move an axial stop from the hitherto lower end plate to the upper end plate and thereby to simplify a tolerance design of the cover to the filter housing bowl or respectively to the ring filter element, because the filter material of the ring filter element no longer has to be taken into consideration for the tolerance design. Hereby, a distinctly closer tolerance chain can be achieved. A further great advantage of the axial stop, formed according to the invention, consists in that the latter functions similarly to the pin with respect to the idling and the guide element with respect to the axial groove as an additional key-lock principle, and it can thereby be prevented that unauthorised ring filter elements can be installed in the filter arrangement and, for example that an internal combustion engine can be damaged through inferior quality.

In an advantageous further development of the solution according to the invention, a slide-off barrier is arranged externally on the axial stop which, when the ring filter element is mounted in the filter arrangement, lies externally against the tubular dome and prevents an unintended sliding off and, for example, a damaging of the guide contour or respectively of the tubular dome. Such a slide-off barrier can, in addition, prevent a displacing of the tubular dome, so that the latter for example does not have to be connected directly on the filter housing or respectively on a filter housing bowl, but rather can also be provided on a function carrier mounted in the filter housing. Such a slide-off barrier therefore simplifies the handling, in particular the mounting of the ring filter element in the filter arrangement.

In an advantageous further development of the solution according to the invention, the slide-off barrier extends by a circumferential angle α of at least 900, preferably even by at least 120°. Hereby, an outer-circumferential lying of the slide-off barrier against the tubular dome is provided, wherein the greater the circumferential angle α is, an increasing guiding can be undertaken.

In a further advantageous embodiment of the solution according to the invention, the axial stop is formed in one piece with the upper end plate, in particular as a one-piece plastic injection moulded part. Hereby, through a one-time change of the plastic injection moulding tool, the axial stop can be produced at a favourable cost and at a high quality. Expediently, the slide-off barrier can be formed in one piece with the axial stop and in one piece with the upper end plate of the ring filter element, whereby a further function integration into the upper end plate takes place and wherein the production of the slide-off barrier can also be brought about by a one-time exchange of the plastic injection moulding tool.

In an advantageous further development of the solution according to the invention, the guide contour is formed on the dome in the manner of a circular ramp, wherein the axial groove is arranged between the highest and the lowest point of the ramp. With a putting on of the ring filter element, the latter therefore slides with its guide element along the circular ramp until it reaches the axial groove and can be inserted into the latter, or slips in. This inserting- or respectively sliding process can be generated here for example by means of a screwing process of the filter housing cover on the filter housing bowl. Alternatively, it is also conceivable that the guide contour is formed on the dome in the manner of a chamfered cannula, wherein the axial groove is arranged at the lowest point. In this case, a particularly smooth-running delivery of the guide element to the axial groove and, thereby, a particularly smooth-running delivery of the pin to the channel on the filter housing bowl side can also be achieved. In contrast to filter arrangements known from the prior art, in which the pin on the ring filter element side was often used as a sliding element, the pin according to the invention no longer has to have such an equal characteristic, and can therefore for example also be formed from an elastic material, in particular from rubber. The tubular dome on the filter housing bowl can form here, for example, a portion of a clean channel.

The present invention is based further on the general idea of indicating a ring filter element for a filter arrangement described in the previous paragraphs, wherein the ring filter element has an upper and a lower end plate and a filter material arranged therebetween, and wherein on the lower end plate an axially projecting pin is provided. Via this pin, the ring filter element, in an installed state in a filter arrangement, can close an idling channel and can guarantee the operation of the filter arrangement. In addition, the ring filter element has a guide element, arranged thereon or respectively on its upper end plate, via which guide element it can be adjusted into a rotation angle position on inserting into the filter arrangement via the guide contour on the dome side, so that the pin also engages into the channel on the filter housing side. On the upper end plate, furthermore, an axial stop is arranged, projecting into the interior of the ring filter element, so that the tolerance design of a filter housing cover to the filter housing bowl or respectively to the ring filter element is simplified, because the filter material no longer has to be taken into consideration for the tolerance design. Here, the axial stop can have any conceivable shape; this must merely bring about a flat abutting against the guide contour and a protection against twisting of the ring filter element. The axial stop is therefore preferably also formed in the manner of a circular ramp or in the manner of a chamfered cannula, i.e. at least partially as a negative contour of the guide contour and thereby brings about the flat abutting against the latter and, in addition, prevents a twisting of the ring filter element, whereby the risk of pleat block formation can be reduced.

The axial stop or respectively a slide-off barrier arranged externally on the axial stop can, furthermore, be formed in one piece with the upper end plate of the ring filter element, in particular even as a one-piece plastic injection moulded part, whereby the production costs can be reduced.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
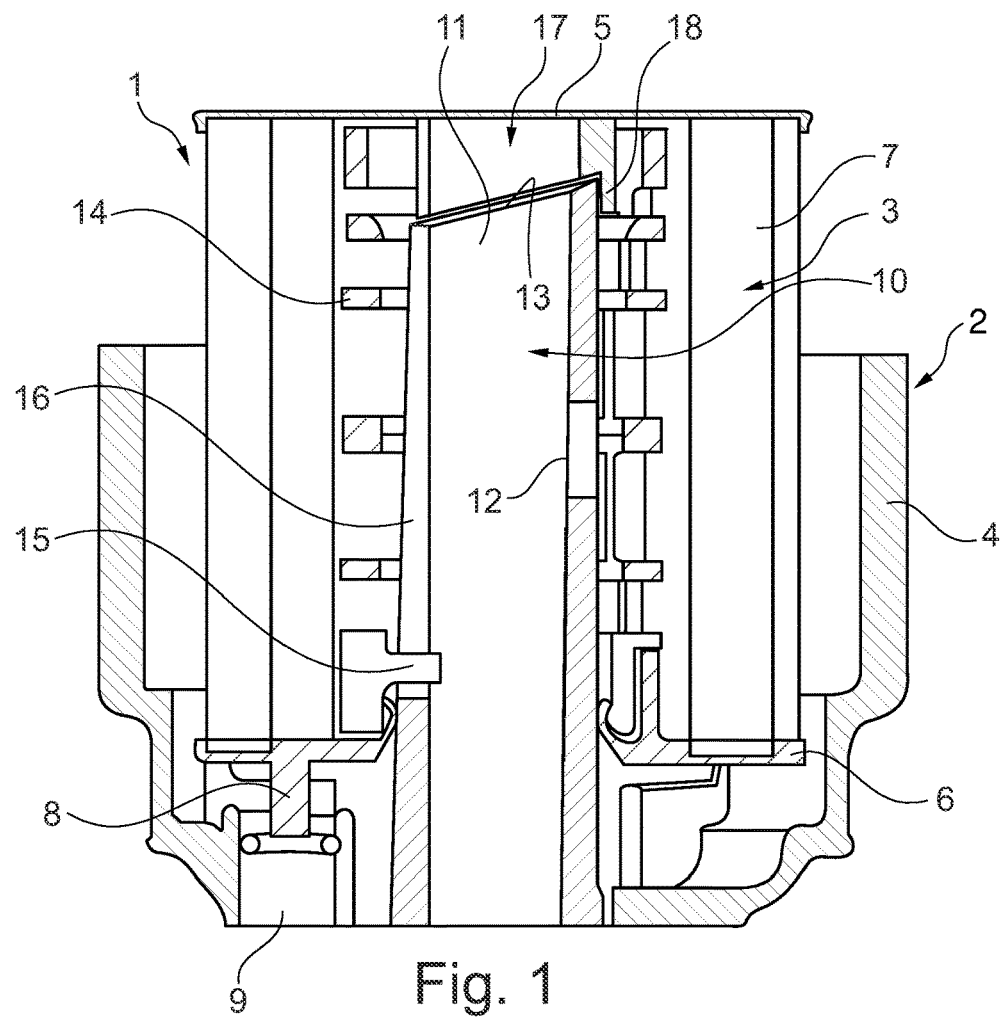
FIG. 1 a sectional illustration through a filter arrangement according to the invention with inserted ring filter element according to the invention, FIG. 2 a detail illustration of a similar filter arrangement, FIG. 3 an illustration, as in FIG. 2, but from a different perspective, FIG. 4 a tubular dome, FIG. 5 an axial stop with slide-off barrier arranged thereon on an upper end plate.
Figure 4:
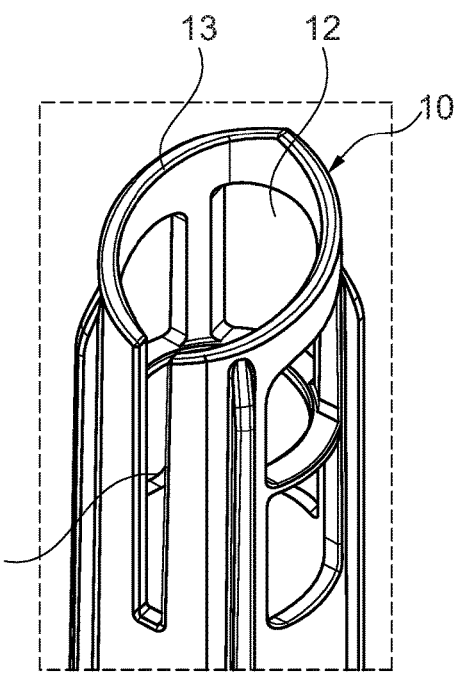

According to FIG. 1, a filter arrangement 1 according to the invention, which can be configured for example as an oil- or fuel filter, has a filter housing 2, in which a ring filter element 3 is arranged. The filter housing 2 has here a filter housing bowl 4 and a filter housing cover, which is usually able to be screwed therewith, and is not illustrated. The ring filter element 3 has an upper end plate 5, a lower end plate 6 and a filter material 7 arranged therebetween, wherein on the lower end plate 6 an axially projecting pin 8 is provided which, when the filter arrangement 1 is mounted, engages into a channel 9 on the filter housing side and closes the latter in a tight manner. The channel 9 can be formed for example as an idling channel. A tubular dome 10 is also provided which, when the filter arrangement 1 is mounted, projects into an interior 11 of the ring filter element 3. It is of course clear here that the tubular dome 10 does not have to be embodied as a closed tube with openings only on the longitudinal end side, but rather can also have a tubular grid structure, as is shown according to FIG. 4, and has lateral windows 12. At a free end of the dome 10, a guide contour 13 is provided, which cooperates with a guide element 15 arranged on the ring filter element 3, in particular on an inner frame 14 thereof. The guide contour 13 has, moreover, an axial groove 16, to which the guide element 15 is guided on mounting of the ring filter element 3 in the filter arrangement 1, and which is arranged relative to the pin 8 so that the latter is only able to be introduced into the channel 9 on the filter housing side in so far as the guide element 15 enters into the axial groove 16 and enables an axial displacing of the ring filter element 3.

Figure 2:
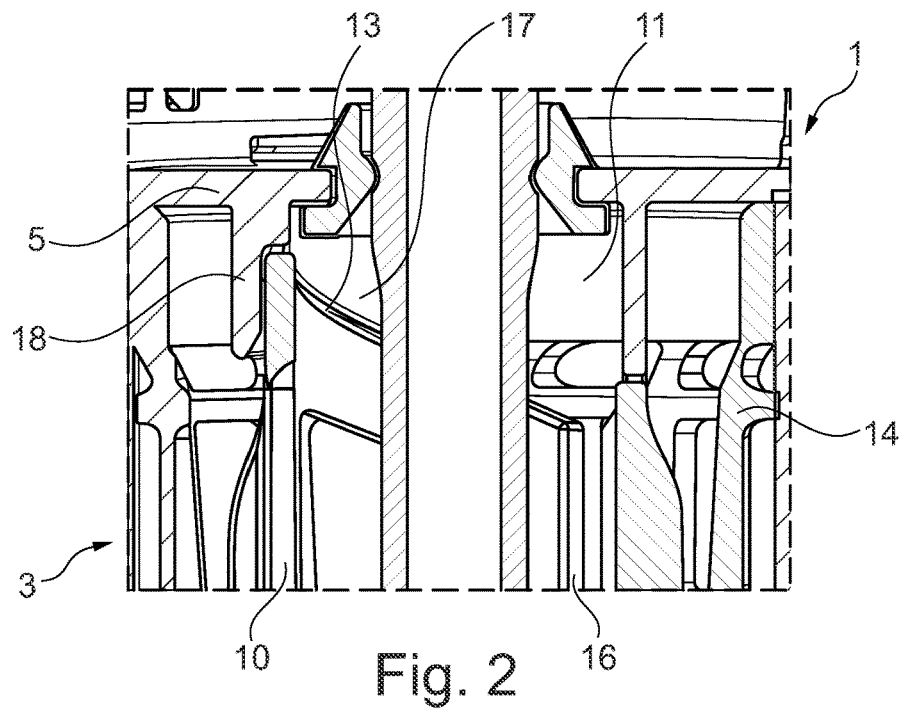
Figure 3:
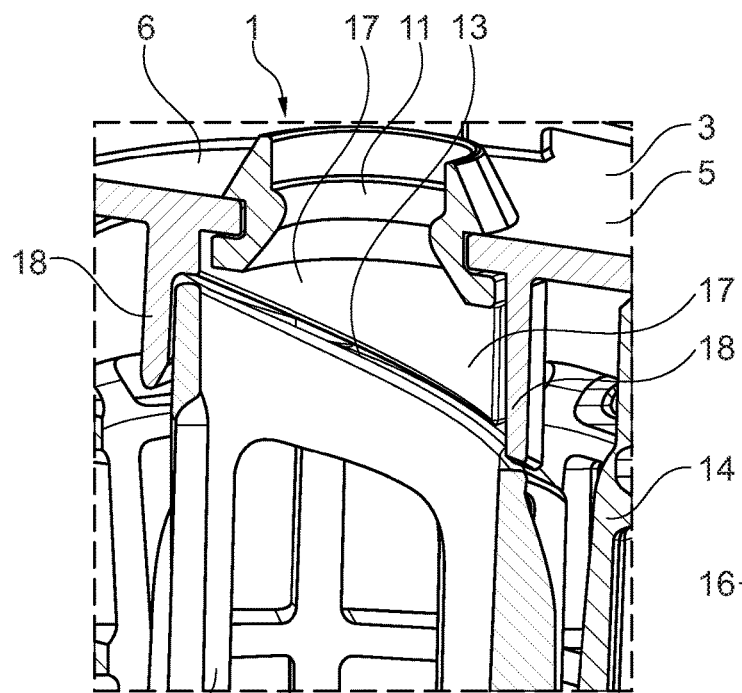
Figure 5:
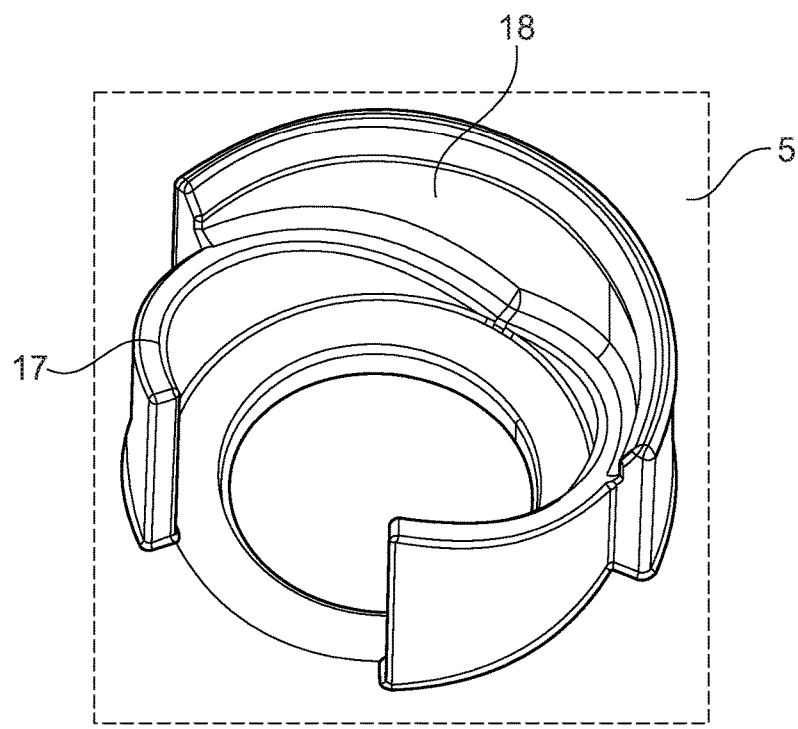

According to the invention, an axial stop 17, projecting into the interior 11 of the ring filter element 3 (cf. also FIGS. 2, 3 and 5) is arranged on the upper end plate 5, which axial stop is formed in a complementary manner to the guide contour 13 at the free end of the dome 10 and, with the ring filter element 3 mounted correctly in the filter arrangement 1, lies flat against the guide contour 13, as is illustrated in FIG. 1 to 3.

Through the axial stop 17 arranged on the upper end plate 5, a tolerance calculation of a cover assembly is greatly simplified, because the tolerance consideration no longer has to be referred to the entire element, but rather only takes place on the upper end plate 5. This is possible because the stop takes place between ring filter element 3 and cover and also between ring filter element 3 and filter housing bowl 4 on the upper end plate 5.

Here, the axial stop 17 can have any complementary negative form of the guide contour 13, as long as this brings about a flat abutting for the axial support on the guide contour 13 and a protection against twisting of the ring filter element 3. The axial stop 17 is preferably also formed here in the manner of a circular ramp or in the manner of a chamfered cannula, but in each case at least partially as a negative contour of the guide contour 13, and thereby brings about the flat abutting against the latter and hereby prevents a twisting of the ring filter element 3, whereby the risk of the pleat block formation can be reduced. Through the complementary formation of the axial stop 17 to the guide contour 13 and the flat abutting, achievable thereby, a damaging of the guide contour 13 can also be prevented, which can exist for example through a punctiform intensive stress and could lead for example to a bending of a function carrier (not shown) bearing the dome 10. A further great advantage of the axial stop 17 arranged on the upper end plate 5 is the realizing of a further key-lock principle, so that only the ring filter element 3 can be installed into the filter arrangement 1, which has an axial stop 17 matching the guide contour 13 of the filter arrangement 1. This means that the contour of the axial stop 17 facing the guide contour 13 must be formed in a complementary manner to the guide contour 13. A further advantage of the axial stop 17 arranged according to the invention on the upper end plate 5 lies in the reduction of the risk of a pleat block formation. As the upper end plate 5 and the lower end plate 6 on which the pin 8 is arranged can no longer be twisted with respect to one another, such a pleat block formation in the filter material 7 can be prevented in a comparatively simple manner.

When the guide contour 13 is formed in the manner of a circular ramp, the axial groove 16 is arranged between the highest and the lowest point of the ramp. In the embodiment of the guide contour 13 shown in FIG. 1 to 4, this is formed in the manner of a chamfered cannula, wherein in this case the axial groove 16 is arranged at the lowest point (cf. also FIGS. 1 and 4).

Observing the filter arrangement 1 and the ring filter element 3 according to the invention further, it can be seen that a slide-off barrier 18 is arranged radially externally on the axial stop 17, which slide-off barrier 18, with the ring filter element 3 mounted in the filter arrangement 1, lies (flat) externally against the tubular dome 10, as is shown for example according to FIG. 1 to 3. Here, it is to be pointed out once again that the term "tubular" does not have to mean tubular in a closed manner, but rather that these can also be understood to mean tubular grid structures as are shown according to FIG. 4. Such a slide-off barrier 18 prevents in particular an undesired slipping off of the dome 10 via the axial stop 17 on the upper end plate 5 by an axial application of force owing to an operating pressure occurring during operation. The slide-off barrier 18 can extend here by a circumferential angle $\alpha$ of at least 90°, preferably even of 120°, and is usually arranged adjacent to the highest point of the guide contour 13, because a slipping off can take place here.

Generally, the guide contour 13 can be formed in the manner of a circular ramp or in the manner of a chamfered cannula (cf. FIG. 4), wherein the axial stop 17 is formed in a complementary manner to the respective guide contour 13 and thereby enables the flat introduction of force with a small amount of surface pressure. The flat resting on one another of the axial stop 17 on the guide contour 13 prevents a high introduction of force in a punctiform manner.

The axial stop 17 and the upper end plate 5 and additionally optionally the slide-off barrier 18 can be formed in one piece here, in particular as a one-piece plastic injection moulded part, and can thereby be produced at a favourable cost and in a high quality.

The guide element 15 is preferably formed as a radially inwardly directed guide pin, as is shown according to FIG. 1.

Not only the filter arrangement 1 as such is to be protected with the present invention, but also an associated ring filter element 3 with an upper end plate 5, a lower end plate 6 and a filter material 7 arranged therebetween, wherein on the lower end plate 6 an axially projecting pin 8 is arranged. Also arranged on the ring filter element 3 is a guide element 15, which can be arranged for example on the lower end plate 6 or on the inner frame 14. On the upper end plate 5, an axial stop 17 is arranged (cf. FIG. 1 to 3), projecting into the interior 11 of the ring filter element 3. Radially externally on the axial stop 17 of the ring filter element 3 according to the invention a slide-off barrier 18 can be arranged, in particular can even be formed in one piece with the axial stop 17.

With the filter arrangement 1 according to the invention and with the ring filter element 3 according to the invention a better tolerance design can be achieved, because the axial stop of the ring filter element 3 now takes place via the upper end plate 5 or respectively via the axial stop 17 arranged there. With the axial stop 17 arranged at the top according to the invention, a relative twisting of the upper end plate 5 to the lower end plate 6 can also be prevented, because the accurately fitting resting of the axial stop 17 with its face side onto the associated guide contour 13 of the dome 10 prevents a twisting. Hereby, in particular a pleat block formation can be prevented, and thereby the filtering performance can be maintained in the long term. Through a supporting of the upper end plate 5 via its stop 17 on the dome 10, furthermore a compression of the filter material 7 can be reliably prevented. However, it is of particular importance that a tolerance design is distinctly simplified, because tolerances of the filter material 7 which are possibly occurring no longer have to be taken into consideration.

The invention claimed is:

1. A filter arrangement, comprising:
a filter housing;
a ring filter element arranged in the filter housing;
the ring filter element including an upper end plate, a lower end plate, and a filter material arranged therebetween;
an axially projecting pin disposed on the lower end plate, which, when the filter arrangement is mounted, engages into a channel on a filter housing side;
a tubular dome which, when the filter arrangement is mounted, engages into an interior of the ring filter element;
the tubular dome having a guide contour at a free end of the tubular dome, the guide contour cooperating with a guide element arranged on the ring filter element, the guide contour having an axial groove to which the guide element is guided on mounting of the filter arrangement, and the guide contour arranged relative to the pin such that the pin is guidable into the channel on the filter housing side, in so far as the guide element enters into the axial groove;
the guide contour configured as at least one of a circular ramp and a chamfered cannula; and
wherein, on the upper end plate, an axial stop is arranged, the axial stop projecting into the interior of the ring filter element and configured in a complementary manner to the guide contour at the free end of the tubular dome; and
wherein, when the ring filter element is mounted in the filter arrangement, the axial stop lies flat against the guide contour.

2. The filter arrangement according to claim 1, further comprising a slide-off barrier arranged radially externally on the axial stop, wherein, when the ring filter element is mounted in the filter arrangement, the slide-off barrier lies externally against the tubular dome.

3. The filter arrangement according to claim 2, wherein the slide-off barrier extends by a circumferential angle α of at least 90°.

4. The filter arrangement according to claim 2, wherein the slide-off barrier is integrally provided with the axial stop and the upper end plate as a single piece.

5. The filter arrangement according to claim 1, wherein the guide element is configured as a radially inwardly directed guide pin.

6. The filter arrangement according to claim 1, wherein the guide element is arranged on a support structure-like inner frame of the ring filter element, and wherein the guide element is surrounded on an end face by a respective end plate of the upper end plate and the lower end plate.

7. The filter arrangement according to claim 1, wherein at least one of:
the guide contour is configured as the circular ramp, and the axial groove is arranged between a highest point of the circular ramp and a lowest point of the circular ramp; and
the guide contour is configured as the chamfered cannula, and the axial groove is arranged at a lowest point of the chamfered cannula.

8. A ring filter element for a filter arrangement, comprising:
an upper end plate, a lower end plate, and a filter material arranged therebetween;
an axially projecting pin disposed on the lower end plate;
a guide element;
an axial stop arranged on the upper end plate and projecting into an interior of the ring filter element; and
wherein the axial stop is configured as at least one of a circular ramp and a chamfered cannula wherein the axial stop has at least one axial surface that extends transversely to a radial direction.

9. The ring filter element according to claim 8, further comprising a slide-off barrier arranged radially externally on the axial stop.

10. The ring filter element according to claim 9, wherein at least one of:
the slide-off barrier extends by a circumferential angle α of at least 90°; and
the slide-off barrier is integrally provided with the axial stop and the upper end plate as a single piece.

11. The filter arrangement according to claim 1, wherein the guide contour is configured as the circular ramp, and wherein the axial stop is configured as a second circular ramp complementary to the guide contour such that the axial stop at least partially defines a negative contour of the guide contour.

12. The filter arrangement according to claim 1, wherein the guide contour is configured as the chamfered cannula, and wherein the axial stop is configured as a second chamfered cannula complementary to the guide contour such that the axial stop at least partial defines a negative contour of the guide contour.

13. The filter arrangement according to claim 1, wherein the pin is composed of an elastic material.

14. The filter arrangement according to claim 1, wherein, when the ring filter element is mounted in the filter arrangement, twisting of the ring filter element is prevented via interaction between the axial stop and the guide contour.

15. The filter arrangement according to claim 2, wherein the slide-off barrier extends by a circumferential angle α of at least 120°.

16. The filter arrangement according to claim 2, wherein the slide-off barrier is integrally provided with the axial stop and the upper end plate as a single, plastic injection moulded piece.

17. A filter arrangement, comprising:
a filter housing;
a ring filter element arranged in the filter housing;
the ring filter element including an upper end plate, a lower end plate, and a filter material arranged therebetween;
an axially projecting pin disposed on the lower end plate, which, when the filter arrangement is mounted, engages into a channel on a filter housing side and closes the channel;
a tubular dome which, when the filter arrangement is mounted, engages into an interior of the ring filter element;
the tubular dome having a guide contour at a free end of the tubular dome, the guide contour cooperating with a guide element arranged on the ring filter element, the guide contour having an axial groove to which the guide element is guided on mounting of the filter arrangement, and the guide contour arranged relative to the pin such that the pin is guidable into the channel on the filter housing side, in so far as the guide element enters into the axial groove;

the guide contour configured as at least one of a circular ramp and a chamfered cannula; and wherein, on the upper end plate, an axial stop is arranged, the axial stop projecting into the interior of the ring filter element and configured in a complementary manner to the guide contour at the free end of the tubular dome;

wherein, when the ring filter element is mounted in the filter arrangement, the axial stop lies flat against the guide contour; and wherein the filter material is configured as a pleat star folded in a zigzag shape.

18. The filter arrangement according to claim 17, wherein the ring filter element further includes an inner frame, and wherein the guide element is a guide pin projecting radially inward from the inner frame.

19. The filter arrangement according to claim 17, wherein the tubular dome is arranged on one of i) the filter housing, and ii) a separate component disposed within the filter housing.

\* \* \* \* \*